US 6,650,958 B1

(12) United States Patent
Balazs et al.

(10) Patent No.: US 6,650,958 B1
(45) Date of Patent: Nov. 18, 2003

(54) INTEGRATED PROCESS TOOL MONITORING SYSTEM FOR SEMICONDUCTOR FABRICATION

(75) Inventors: Attila Balazs, Clackamas, OR (US);
Bruce Whitefield, Camas, WA (US);
Hiroshi Mizuno, Gresham, OR (US);
Russell Whaley, Gresham, OR (US);
Paul Szasz, Gresham, OR (US); Steven Reder, Boring, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/283,688

(22) Filed: Oct. 30, 2002

(51) Int. Cl.[7] ............................................... G06F 19/00
(52) U.S. Cl. ........................ 700/121; 700/108; 700/117; 438/5
(58) Field of Search .......................... 700/31, 108, 117, 700/174, 121; 438/5, 14

(56) References Cited

U.S. PATENT DOCUMENTS

| | | | | |
|---|---|---|---|---|
| 5,657,254 A | * | 8/1997 | Sierk et al. ..................... 702/98 |
| 6,303,395 B1 | * | 10/2001 | Nulman ......................... 438/14 |
| 6,363,294 B1 | * | 3/2002 | Coronel et al. .............. 700/121 |
| 6,408,220 B1 | * | 6/2002 | Nulman ........................ 700/121 |
| 6,456,894 B1 | * | 9/2002 | Nulman ........................ 700/121 |
| 6,553,542 B2 | * | 4/2003 | Ramaswamy et al. ......... 716/2 |
| 6,556,884 B1 | * | 4/2003 | Miller et al. ................. 700/121 |
| 2002/0055804 A1 | * | 5/2002 | Betawar et al. ............. 700/117 |

* cited by examiner

Primary Examiner—Leo Picard
Assistant Examiner—Douglas S. Lee
(74) Attorney, Agent, or Firm—Trexler, Bushnell, Giangiorgi & Blackstone, LTD

(57) ABSTRACT

An integrated process tool monitoring system for semiconductor fabrication. Specifically, a process tool parameter auditing system, where a process tool user need not run a different verification system for each process tool type used and need not download parameters every time before a semiconductor device or material is to be processed by the process tool.

13 Claims, 2 Drawing Sheets

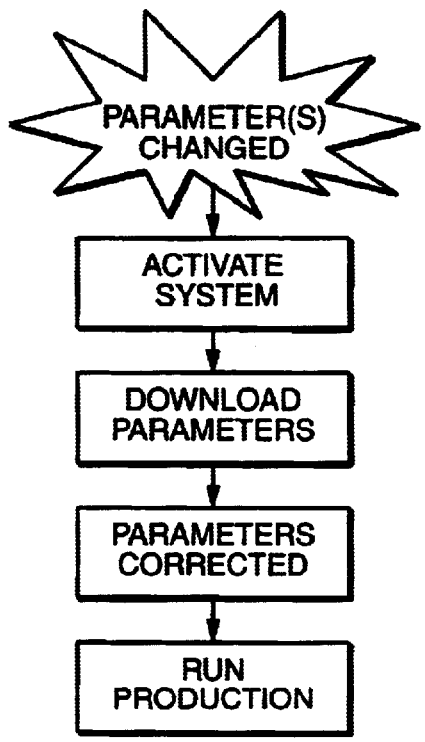
FIG._1
(PRIOR ART)
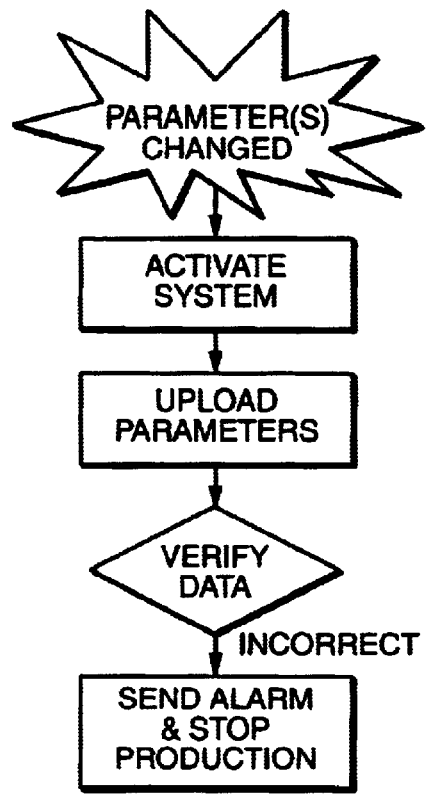
FIG._2
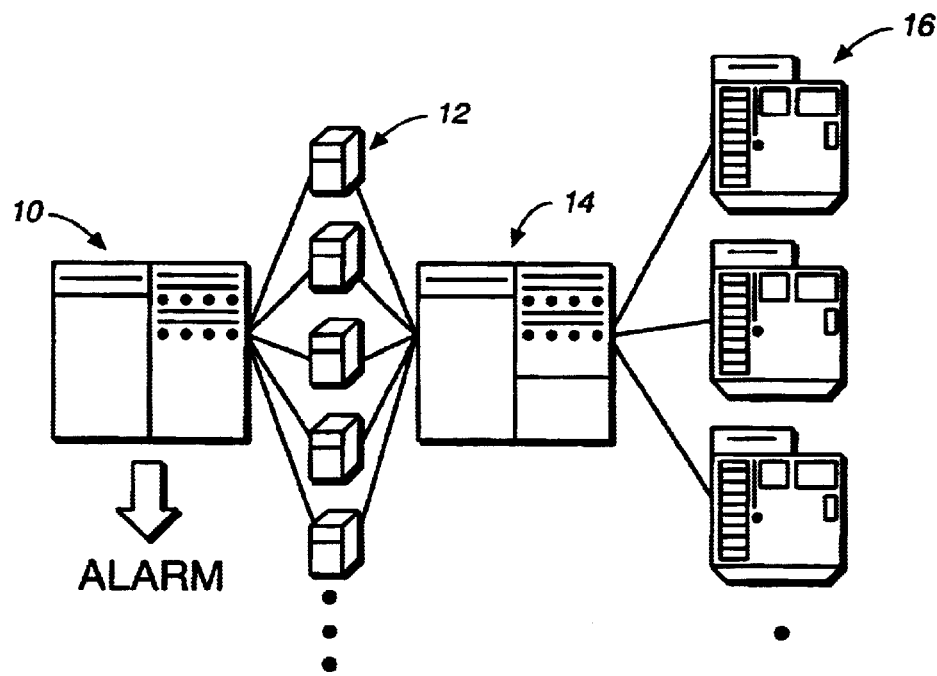
FIG._3

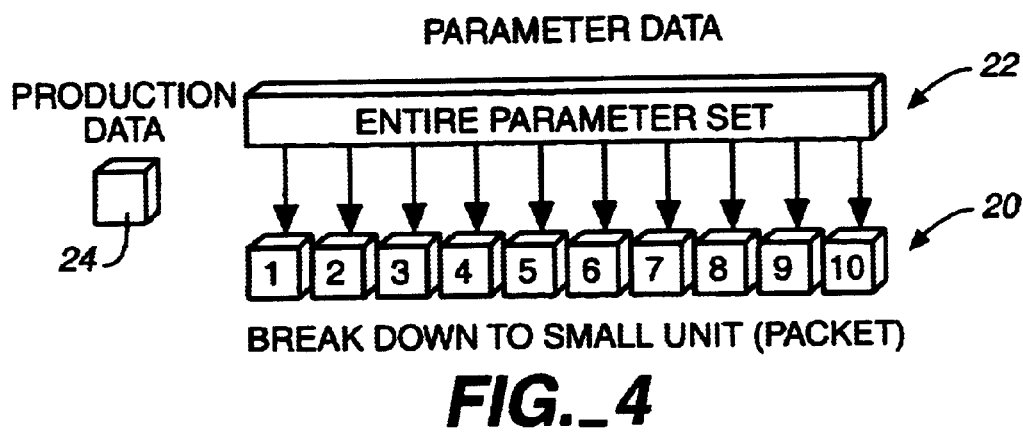
FIG._4
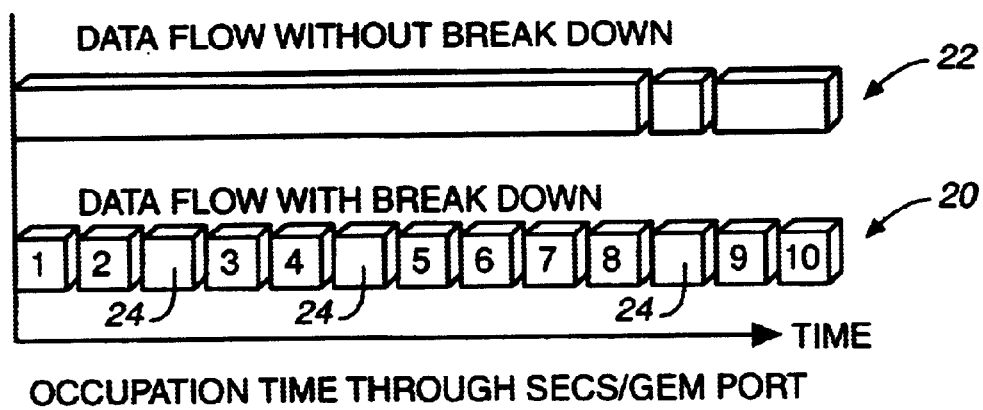
FIG._5

INTEGRATED PROCESS TOOL MONITORING SYSTEM FOR SEMICONDUCTOR FABRICATION

BACKGROUND

The present invention generally relates to semiconductor process tool monitoring systems, and more specifically relates to an integrated auditing system for monitoring one or more process tools used in connection with semiconductor fabrication.

Many different types of process tools are used in connection with semiconductor fabrication. Such process tools may include thermal processors, ion implantation systems, chemical vapor deposition reactors, optical steppers, reactive ion etchers, sputtering chambers, etc. Each process tool is driven by one or more sets of parameters, where the parameters define the operation of the process tool. Operating a process tool with the wrong settings, i.e., with the wrong parameters, can lead to product quality problems. Therefore, it is important to operate each process tool with the correct parameters within a semiconductor fabrication process. Tool setting parameters are for defining the tool operating condition (tool constants) and process conditions (tool recipe). Operating conditions determine how the tool works. For example, there are "wafer handling robot position", "heater power ramp up rate". etc. Process conditions determine how the product is processed, for example, "process time", "pressure in process chamber", "heater temperature", etc.

Semiconductor fabrication has become more and more capable, but also more and more complicated. As such, the number of parameters used to define the operation of a given process tool has, in some cases, become very high. In some cases, as many as 6000 parameters or more are used to drive a process tool. As a result, when the parameters are incorrect, it is often very difficult, and at times impossible, to determine which parameters are, in fact, incorrect, so that the parameters can thereafter be corrected.

Several process tool suppliers have developed parameter verification systems in an attempt to address this problem. In such case, a verification system is provided by the process tool supplier, and a process tool user utilizes the verification system to check the parameters of the process tool. Typically, there are several different suppliers associated with a given set of process tools. Hence, a user is required to run a different verification system for each process tool type used. Because, each parameter verification system has a different operation style, it is challenging to check the parameters of each of the process tools. In most cases, parameter verification is performed manually. Considering the number of parameters, on certain tools this is a very time consuming task.

At least one software supplier has developed a system whereby a database of process tool parameters is maintained. The system is generally illustrated in FIG. 1 and provides that a tool user downloads the parameters from the system to the tool, and then operates the process tool using the parameters. This type of system requires a tool user to download one or more sets of parameters every time before a semiconductor device or material is processed by the process tool. As discussed above, the number of parameters for a given process tool may exceed 6000. Hence, data communication workload is a problem in implementing such a system.

OBJECTS AND SUMMARY

A general object of an embodiment of the present invention is to provide an integrated process tool monitoring system for semiconductor fabrication. This system is an external system not integrated into the process tool.

Another object of an embodiment of the present invention is to provide a process tool parameter auditing system, where a process tool user need not run a different verification system for each process tool type used. A customized database allows each tool to have a unique parameter set.

Another object of an embodiment of the present invention is to provide a process tool parameter auditing system, where a process tool user need not download parameters every time before a semiconductor device or material is to be processed by the process tool.

Briefly, and in accordance with at least one of the foregoing objects, an embodiment of the present invention provides an integrated process tool monitoring system for semiconductor fabrication. Specifically, a process tool parameter auditing system, where a process tool user need not run a different verification system for each process tool type used and need not download parameters every time before a semiconductor device or material is to be processed by the process tool.

BRIEF DESCRIPTION OF THE DRAWINGS

The organization and manner of the structure and operation of the invention, together with further objects and advantages thereof, may best be understood by reference to the following description, taken in connection with the accompanying drawings, wherein:

FIG. 1 is a flow chart which illustrates a prior art parameter monitoring approach;

FIG. 2 is a flow chart which illustrates a parameter monitoring approach which is in accordance with an embodiment of the present invention;

FIG. 3 is a diagram of a system which can be used to implement the approach shown in FIG. 2;

FIG. 4 is a diagram which shows data downsizing in accordance with an embodiment of the present invention; and FIG. 5 is a diagram which shows data flow in accordance with an embodiment of the present invention.

DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 2 shows an approach which is in accordance with an embodiment of the present invention. The approach provides that process tool parameters are audited as opposed to being merely downloaded. As shown, when the parameters of the process tool are changed, a system is activated and the parameters are uploaded to the system. The system verifies the data, i.e., uses reference data to audit the parameters, and thereafter transmits an alarm of some sort if it is determined that the parameters in some way are incorrect. The alarm which is transmitted may be, for example, an e-mail, text messaging on either a cell phone, PDA or pager, and/or a facsimile, transmitted to a party such as an operator, technician or engineer. By using such an approach, a centralized process tool parameter audit system is provided, incorrect parameters are detected, and product quality problems are prevented. In a more typical embodiment of the invention, the change of a parameter is not the triggering method for the parameter upload. A continuous loop of parameter upload is active and the process repeats continuously.

FIG. 3 shows a system structure which can be utilized in association with the approach shown in FIG. 2. As shown, the system structure may include a network where a manufacturing execution system 10 is in communication with equipment interfaces 12 which, in turn, are in communication with a parameter control system 14 which is operatively connected to a plurality of process tools 16. Preferably, reference data is maintained in the manufacturing execution system 10 (or at least is accessible by the manufacturing execution system 10), and the manufacturing execution system 10 is configured to control material management through the processing tools. The parameter control system 14, through the network is configured to request uploading of the parameters from the process tools 16. Preferably, the manufacturing execution system 10 is configured to transmit an alarm if it is determined that the parameters are incorrect. Such an alarm may take the form of, for example, an e-mail, text messaging on either a cell phone, PDA or pager, and/or a facsimile, transmitted to a party-such as an operator, technician or engineer.

Preferably, the parameter control system 14 is configured to upload the parameters in packets 20 as shown in FIG. 4. As shown in FIG. 4, preferably the parameter data is not transmitted in an entire parameter set as a single block 22 of data, but is instead transmitted in packets 20. As shown in FIG. 5, preferably the parameter control system 14 is configured such that the data flow provides that production data 24, such as lot ID, number of wafer, start time, end time, etc., is transmitted at the same time that the packets (relating to the process tool parameters to be audited) are uploaded to the manufacturing execution system 10. Providing that small data packets 24 are transmitted frequently, instead of a large data block 22 being transmitted at once, provides that other data communication (i.e., the transmission of production data 24) need not be interrupted. The packet configuration of parameter data allows frequent delays for factory systems to communicate. There is a configurable pause between packets to accommodate efficiency issues of communication on different tool types.

Such an auditing system provides several advantages, such as centralization of process tool parameter checking. Specifically, a single system can be used to monitor several process tool types. As such, the system is easier to use and control than having to utilize an array of systems where each system may have its own operation style. The system also provides that parameters need not be downloaded every time the process tool is to begin processing. This eliminates the need for developing a centralized parameter management system that has the capability to edit and download parameters in the different formats used by each equipment supplier. This also reduces the tool idle time that would be incurred while waiting for parameters to be downloaded between each production lot. Since the parameters are audited and confirmed correct on each tool, only the parameter that needs to be customized for specific recipes needs to be downloaded. Additionally, the parameters can be uploaded and verified even while the process tool is processing or idling.

While an embodiment of the present invention is shown and described, it is envisioned that those skilled in the art may devise various modifications of the present invention without departing from the spirit and scope of the appended claims.

What is claimed is:

1. A method of auditing process tool parameters for semiconductor fabrication, said method comprising: activating a system; uploading the process tool parameters to the system, whereafter the system automatically uses reference data to audit the process tool parameters regardless of whether the process tool parameters have been edited, and thereafter transmits an alarm if the parameters are determined by the system to be incorrect with regard to the reference data.

2. A method as recited in claim 1, further comprising providing a parameter control system in operative connection with the process tool, and using the parameter control system to upload the process tool parameters through a network connected to the parameter control system.

3. A method as recited in claim 1, further comprising providing a parameter control system in operative connection with a plurality of process tools, and using the parameter control system to upload the process tool parameters through a network connected to the parameter control system.

4. A method as recited in claim 1, further comprising uploading the process tool parameters in packets.

5. A method as recited in claim 1, further comprising uploading the process tool parameters in packets while transmitting production data.

6. A method of auditing process tool parameters tool for semiconductor fabrication, said method comprising: providing a system which is activatable; maintaining reference data which the system can use; having the system receive the process tool parameters, whereafter the system uses the reference data to audit the process tool parameters regardless of whether the process tool parameters have been edited, and whereafter the system transmits an alarm if the process tool parameters are determined by the system to be incorrect with regard to the reference data.

7. A method as recited in claim 6, further comprising providing that the system is connected to a network, wherein a parameter control system is in the network and is in operative connection with the process tool.

8. An auditing system for auditing process tool parameters for semiconductor fabrication, said auditing system comprising: a first system configured to use reference data to audit process tool parameters regardless of whether the process tool parameters have been edited and transmit an alarm if the process tool parameters are determined by the system to be incorrect with regard to the reference data; a second system in communication with the first system and connected to the process tool, said second system configured to transmit the process tool parameters to the first system for auditing.

9. An auditing system as recited in claim 8, said system further comprising a network which includes a plurality of equipment interfaces in communication with said first and second system.

10. An auditing system as recited in claim 8, wherein said second system comprises a parameter control system in operative connection with a plurality of process tools.

11. An auditing system as recited in claim 8, wherein said second system is configured to transmit the process tool parameters in packets.

12. An auditing system as recited in claim 8, wherein said second system is configured to transmit the process tool parameters in packets while transmitting production data.

13. An auditing system as recited in claim 8, wherein said second system is configured to transmit an alarm via e-mail, text messaging on either a cell phone or PDA, and/or facsimile.

* * * * *